F. F. GILLETT.
CONTROLLING MECHANISM.
APPLICATION FILED JULY 24, 1915. RENEWED MAY 24, 1916.
1,210,303.
Patented Dec. 26, 1916.
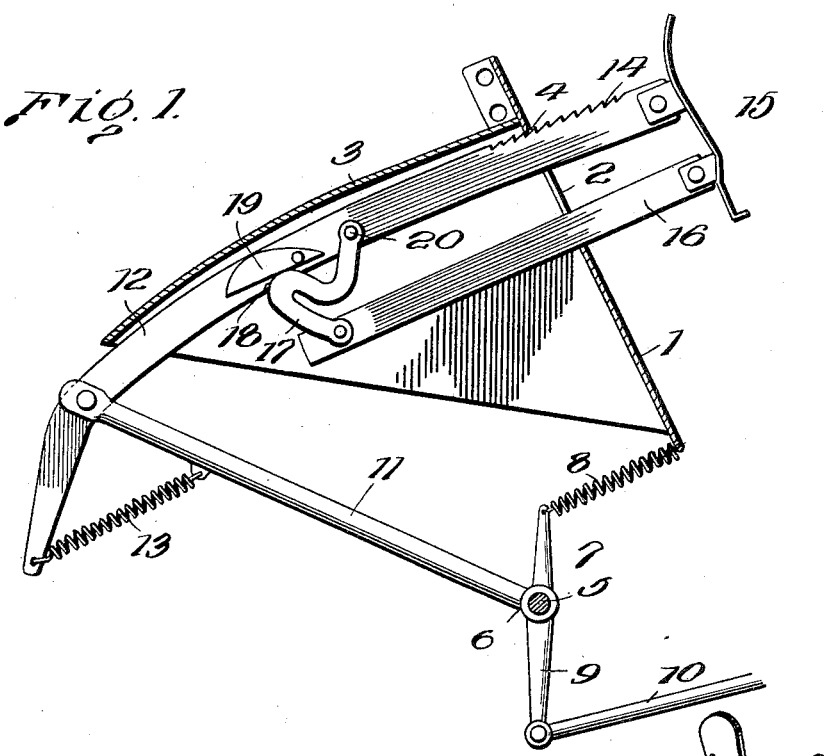
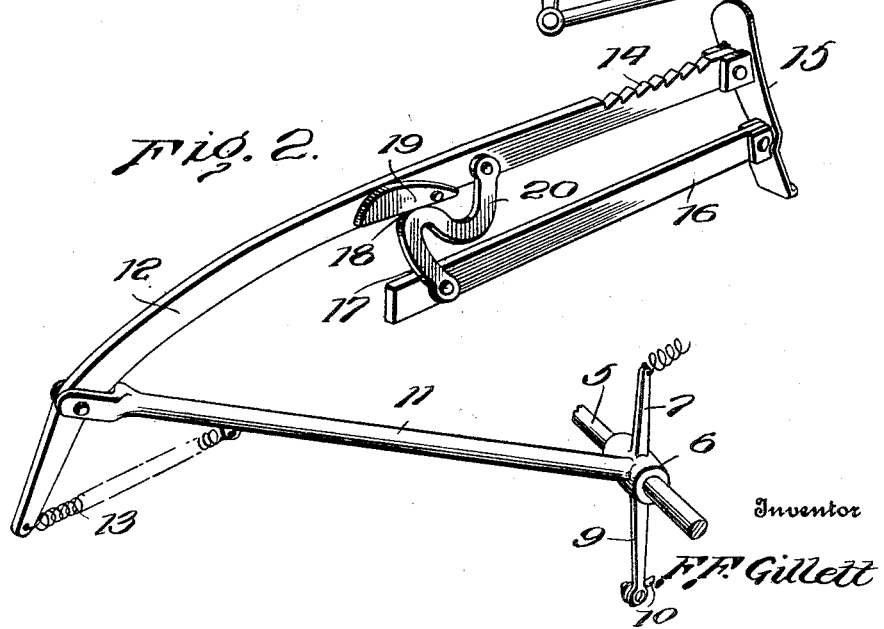
Inventor
F. F. Gillett
By
Attorneys

UNITED STATES PATENT OFFICE.

FRED F. GILLETT, OF HALFWAY, OREGON.

CONTROLLING MECHANISM.

1,210,303.      Specification of Letters Patent.      Patented Dec. 26, 1916.

Application filed July 24, 1915, Serial No. 41,706. Renewed May 24, 1916. Serial No. 99,705.

*To all whom it may concern:*

Be it known that I, FRED F. GILLETT, a citizen of the United States, residing at Halfway, in the county of Baker and State of Oregon, have invented certain new and useful Improvements in Controlling Mechanisms, of which the following is a specification.

This invention relates to devices for controlling an operating mechanism and has special reference to devices for controlling brakes or clutches on automobiles. It is however, susceptible of use in various other connections.

One object of the present invention is to provide a mechanism of simple construction and arrangement of parts which will be always under the control of the operator and which may be manipulated by a slight movement of the operator's foot to either apply or release the brake, clutch, or other mechanism controlled thereby.

A further object of the invention is to provide a novel mechanism for the stated purpose which will act positively and will not be liable to get out of order.

Further incidental objects of the invention will appear as the description of the same proceeds and the invention resides in certain novel features which will be particularly pointed out in the claims following the description.

The invention is illustrated in the accompanying drawings in which—

Figure 1 is a sectional elevation of the device illustrating the manner of mounting the same upon a vehicle, and Fig. 2 is a perspective view of the operating parts removed from the casing shown in Fig. 1.

In applying my invention to an automobile or other vehicle, I construct the dash 1 of the vehicle with a vertical slot 2 and to the under or forward side of the dash, I secure a housing or casing 3, the rear end of which extends around the said slot, the upper end of the slot being shaped to provide a pawl or dog 4, the purpose of which will presently appear. Below the dash and housing, I secure to the vehicle in any desired or convenient manner, a transverse rod 5 upon which is rotatably mounted a hub or sleeve 6. A radial arm 7 is rigid with said hub or sleeve 6 and a spring 8 is secured to the said arm 7 and to the dash or other fixed part of the vehicle so as to act upon the said arm and hold it normally in such a position that the brake will be unapplied. An oppositely disposed radial arm 9 is also rigid with the hub or sleeve 6 and extends therefrom, the free end of this arm being connected by a link 10 with the brake, clutch, or other mechanism to be manipulated. A third arm or lever 11 projects forwardly from the hub or sleeve 6 at a point intermediate the arms 7 and 9 and the outer free end of this arm or lever 11 has pivotally attached thereto an upper bar 12 which extends upwardly and rearwardly and also downwardly from the said lever as clearly shown. The inner lower end of this bar 12 is connected with the lever 11 by a spring 13 which tends to throw the upper portion of said bar upwardly and thereby carry a rack 14, formed on the upper edge of the same, into engagement with the tooth, pawl, or holding dog 4. To the upper rear end of the said bar 12, I pivotally attach a footrest or treadle 15 and to the heel portion of said foot-rest or treadle, I pivotally attach the rear end of a lower bar 16, as shown. The bars 12 and 16 extend through the slot 2 in the dash and are inclosed within the housing 3 so that they will be maintained in their proper relative positions and be operative at all times. To the lower bar 16, near the forward end thereof, I pivot a trip or lever 17 which is of ogee shape so as to present a cam lifting surface 18 adapted to bear against the under edge of a latch 19 which is pivotally attached to the upper bar 12 on the side of the same as shown and as will be readily understood. The upper end of the trip 17 is disposed in rear of the latch 19 and is pivoted to the upper bar 12 as shown at 20.

It will be noted that the upper bar 12 and the latch 19 are disposed close to the top of the housing 3. When it is desired to apply the brake, the operator exerts a slight pressure upon the toe-portion of the footrest 15 thereby pushing the bar 12 forwardly and downwardly within the housing and consequently, swinging the lever 11 about the rod 5 as a center. A pushing force is thereby exerted upon the link 10 which will cause the brake to be set and the spring 8 will be put under an increased tension through the movement of the arm 7 in a direction opposite to that of the arm 9. When it is desired to release the brakes, a slight push is exerted upon the lower bar 16 through the heel portion of the foot-rest and the foot-rest will, consequently, be caused to swing upon its pivotal connection with the upper bar 12 so that the lower bar 16 will be pushed forwardly and downwardly. The trigger or trip 17 will, of course, swing upwardly through its pivotal connections with the bars 16 and 12 and the cam surface 18 of said trip will consequently be caused to act upon the latch 19 so that the said latch will swing upwardly against the top plate of the housing 3. Further movement of the latch being thereby resisted, the continuous pressure exerted through the bar 16 will cause the said latch to act as a fulcrum about which the trip 17 will rock, the pivot 20 being thereby caused to move downwardly and the bar 12 being, of course, given a similar movement so that the rack 14 will be released from the tooth 4, whereupon the spring 8 will contract and return the parts to normal initial position. When it is desired to again apply the brake, the pressure is exerted through the foot-rest upon the upper bar 12 so that the foot-rest will swing about its pivotal connections with the arms 12 and 16 and the said upper bar will be pushed forwardly and downwardly as previously described.

It will be readily noted that I have provided an exceedingly simple device which operates efficiently at all times. The spring 13 serves to maintain the proper operative relation of the lever 11 and the upper bar 12 at all times while the spring 8 tends to release the brake immediately upon the said bar 12 being released from its engagement with the tooth 4. It will, of course, be understood that the link 10 may be connected with a clutch and the parts may be arranged so that the clutch will be normally applied or normally released, as preferred.

Having thus described my invention, what I claim and desire to secure by Letters Patent is:—

1. A mechanism for the purpose set forth comprising an oscillatory lever, means for connecting said lever to a mechanism to be controlled thereby, a pair of reciprocatory bars, one of said bars being connected to said lever, means for holding said bar in a set position, a manipulating device connected with each of said bars, and connections between the bars whereby to release the bar connected to the lever.

2. The combination of an oscillatory lever, connections between said lever and a device to be controlled, a setting bar connected to said lever, a releasing bar, connections between the releasing bar and the setting bar, and a manipulating member common to the setting and releasing bar.

3. The combination of a sleeve mounted for rotary movement, connections between said sleeve and a device to be controlled, yieldable means acting upon said sleeve to hold said device in a normal position, a lever carried by said sleeve, a setting bar connected with said lever, means for holding said setting bar in an adjusted position, a releasing bar, and connections between said releasing bar and the setting bar whereby to release said holding means.

4. The combination of a setting bar, means whereby movement of said setting bar will operate a mechanism to be controlled, a releasing bar, means for operating the setting bar and the releasing bar, and cam connections between the said bars whereby operation of the releasing bar will move the setting bar to inoperative position.

5. The combination of a setting bar, a lever pivoted to said bar between the ends thereof, connections between said lever and a device to be controlled, a spring connecting the lever with one end of said bar, means acting upon the opposite end of said bar to actuate the same, means near the last named end of the bar to hold the same in a set position, and means acting upon an intermediate portion of the bar to release the same.

6. The combination of a setting bar, connections between said bar and a device to be controlled, means for actuating said bar to set said device, a releasing bar, a latch upon the setting bar, and a trip carried by the releasing bar and engaging said latch whereby to release the setting bar.

7. The combination of a housing, a setting bar disposed within the housing near the top thereof, connections between the setting bar and a device to be controlled thereby, a releasing bar disposed below the setting bar, a foot-rest pivotally connected to the ends of the said bars at one side of the housing, a latch pivoted at one end to the setting bar, and a trip pivoted at its ends to the setting bar and the releasing bar respectively and provided between its ends with a cam portion engaging the lower edge of the said latch.

8. The combination of a fixed support having a slot therein, a tooth formed at one end of said slot, a housing extending from said support, upper and lower bars extending through said slot and into said housing, the upper bar being formed on its upper edge with a rack adapted to engage said tooth and having its inner end extended beyond the housing, a foot-rest pivotally attached to both of said bars, connections between the inner end of the upper bar and a device to be controlled thereby, a latch pivoted upon the side of said bar, and a trip pivoted at its ends to the upper and lower bars respectively and having its intermediate portion bearing against the said latch whereby upon movement of the lower bar the latch will be moved against the top of the housing and the rack on the upper bar released from the said tooth.

9. The combination of a setting bar, a releasing bar, an operating means common to both said bars, means for connecting the setting bar to a mechanism to be controlled, and releasing connections between the setting bar and the releasing bar.

In testimony whereof I affix my signature.

FRED F. GILLETT. [L. S.]

Copies of this patent may be obtained for five cents each, by addressing the "Commissioner of Patents, Washington, D. C."